Figure 1A:
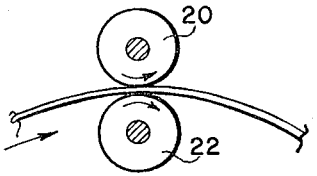
Figure 1:
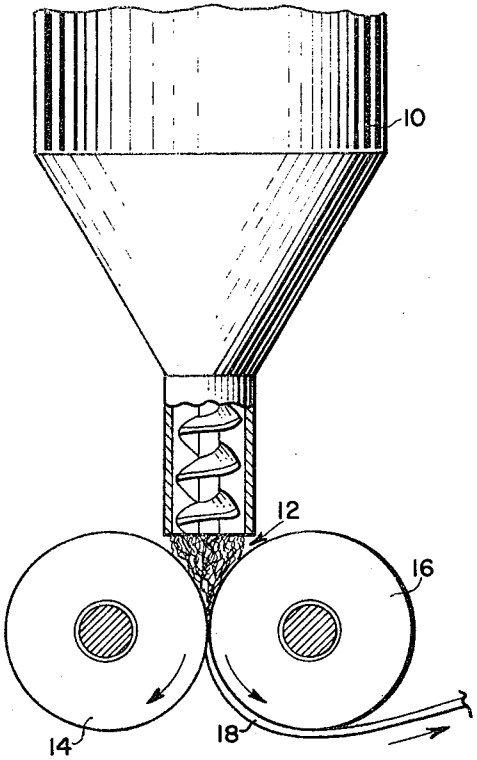
Figure 2:
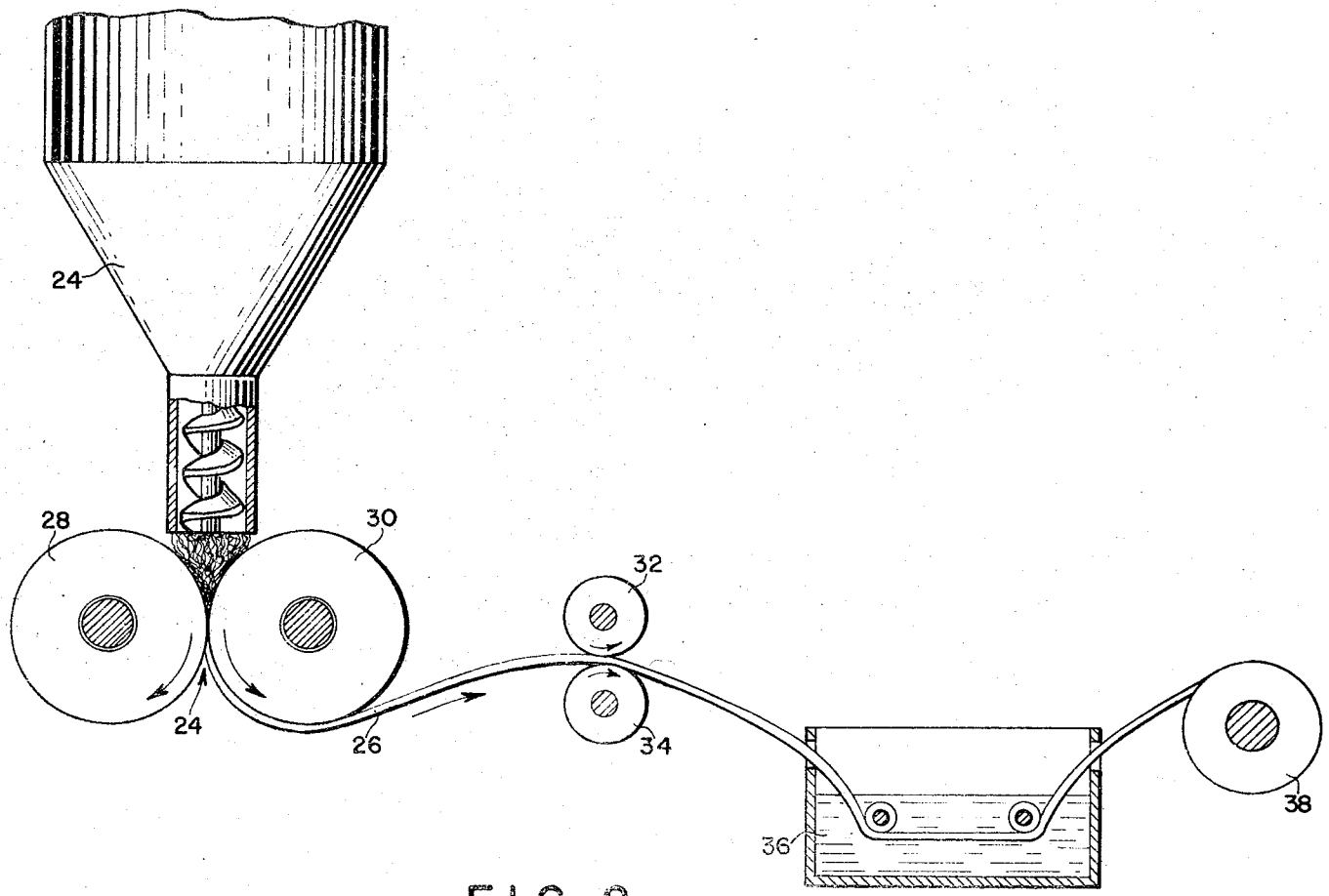

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 12, 1970

874 O.G. 369

T874,002

PROCESS FOR IMPROVING THE BLUSH RESISTANCE OF SHEETS OF CRYSTALLIZABLE ORGANIC POLYMER

John M. Wininger, Jr., Paul K. Fain, Jr., and Robert B. McFall, all of Box 511, Kingsport, Tenn. 37662

Continuation of application Ser. No. 735,729, June 10, 1968. This application Nov. 4, 1969, Ser. No. 871,658

Int. Cl. B29d *7/14*

U.S. Cl. 264—175

2 Sheets Drawing. 11 Pages Specification

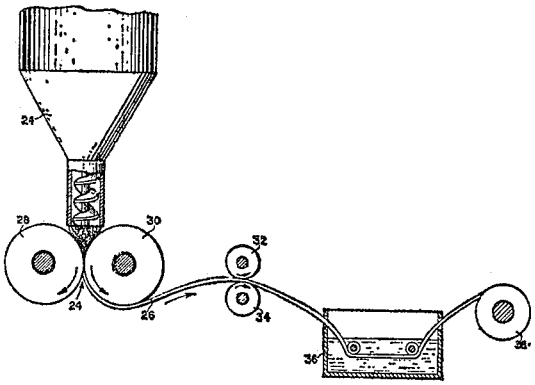

Sheets of normally crystalline organic polymer provided with improved blush resistance by (a) providing the sheet with molten surfaces and then rapidly quenching or (b) by reducing the sheet in thickness an amount in the range of 10–30% while maintained at a temperature below its softening point. The polymer may be, for example, polyethylene, polypropylene or polyallomer.

May 12, 1970 J. M. WININGER, JR., ET AL T874,002

PROCESS FOR IMPROVING THE BLUSH RESISTANCE OF SHEETS OF CRYSTALLIZABLE ORGANIC POLYMER

Original Filed June 10, 1968 2 Sheets-Sheet 1

JOHN M. WININGER, JR.
PAUL K. FAIN, JR.
ROBERT B. MCFALL
INVENTORS

BY William J. French
George P. Chandler
ATTORNEYS

May 12, 1970 J. M. WININGER, JR., ET AL T874,002

PROCESS FOR IMPROVING THE BLUSH RESISTANCE OF SHEETS OF CRYSTALLIZABLE ORGANIC POLYMER

Original Filed June 10, 1968 2 Sheets-Sheet 2

JOHN M. WININGER, JR.
PAUL K. FAIN, JR.
ROBERT B. MCFALL
INVENTORS

BY William T. French
George P. Chandler
ATTORNEYS